(12) United States Patent
Campbell et al.

(10) Patent No.: US 10,866,633 B2
(45) Date of Patent: Dec. 15, 2020

(54) SIGNING WITH YOUR EYES

(71) Applicant: Microsoft Technology Licensing, LLC, Redmond, WA (US)

(72) Inventors: Jonathan T Campbell, Redmond, WA (US); Harish S Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 15/445,469

(22) Filed: Feb. 28, 2017

(65) Prior Publication Data

US 2018/0246567 A1 Aug. 30, 2018

(51) Int. Cl.
| | | |
|---|---|---|
| *G06F 3/01* | (2006.01) | |
| *G06F 21/32* | (2013.01) | |
| *G06K 9/00* | (2006.01) | |

(52) U.S. Cl.
CPC .............. *G06F 3/013* (2013.01); *G06F 21/32* (2013.01); *G06K 9/0061* (2013.01); *G06K 9/00187* (2013.01)

(58) Field of Classification Search
CPC ...... G06F 3/013; G06F 21/32; G06K 9/00268
See application file for complete search history.

(56) References Cited

U.S. PATENT DOCUMENTS

| | | |
|---|---|---|
| 6,553,494 B1 | 4/2003 | Glass |
| 8,086,867 B2 | 12/2011 | Freeman et al. |
| 8,705,808 B2 | 4/2014 | Determan et al. |
| 8,867,062 B2* | 10/2014 | Popovic ............ B43L 13/00 358/1.15 |
| 2002/0042879 A1 | 4/2002 | Gould et al. |
| 2005/0106538 A1* | 5/2005 | Freeman ............ G09B 5/02 434/167 |
| 2005/0207614 A1 | 9/2005 | Schonberg et al. |
| 2008/0292195 A1 | 11/2008 | Vijayasenan et al. |
| (Continued) | | |

OTHER PUBLICATIONS

Goering, Michael. Curved Line Tool in MS Paint. YouTube [online] [video]. Feb. 4, 2015 [retrieved on Sep. 27, 2019]. Retrieved from <https://www.youtube.com/watch?v=1lvdx2cRsa4> (Year: 2015).*

(Continued)

*Primary Examiner* — Kent W Chang
*Assistant Examiner* — Andrew Lee
(74) *Attorney, Agent, or Firm* — Schwegman Lundberg & Woessner, P.A.

(57) ABSTRACT

A user's signature may be decomposed into one or more components. The components may be described using one or more control points. A user may sign with their eyes by focusing their gaze on a set of these control points that make up the signature. If the user's gaze is within a threshold distance from a control point the signature is validated. Moreover, by modifying the control points based upon the actual gaze location (which is within the threshold distance), the signature may be slightly modified. For example, the signature may be decomposed into one or more components as Bezier curves and the user may be asked to focus on each control point of each of the one or more Bezier curves. Modifying the control points of a Bezier curve slightly still produces a smooth curve, but introduces natural variations.

20 Claims, 15 Drawing Sheets

(56) References Cited

U.S. PATENT DOCUMENTS

| | | | |
|---|---|---|---|
| 2010/0128291 A1* | 5/2010 | Vendrow | G06F 21/64 |
| | | | 358/1.9 |
| 2010/0161993 A1 | 6/2010 | Mayer | |
| 2011/0093777 A1 | 4/2011 | Dunn et al. | |
| 2011/0185184 A1 | 7/2011 | Guenther | |
| 2012/0256944 A1* | 10/2012 | Crumly | G06K 9/222 |
| | | | 345/611 |
| 2013/0024208 A1 | 1/2013 | Vining | |
| 2013/0307771 A1 | 11/2013 | Parker et al. | |
| 2014/0047560 A1 | 2/2014 | Meyer et al. | |
| 2015/0220717 A1 | 8/2015 | Shin | |
| 2015/0324568 A1 | 11/2015 | Publicover et al. | |
| 2016/0022167 A1 | 1/2016 | Simon | |

OTHER PUBLICATIONS

Ross, et al., "Visual Cryptography for Biometric Privacy", In Proceedings of IEEE Transactions on Information Forensics and Security, vol. 6, No. 1, Mar. 2011, pp. 70-81.

Microsoft, "Microsoft Sight Sign a Windows app", [online]. [retrieved on Apr. 21, 2017]. Retrieved from the Internet: URL: <https://www.microsoft.com/en-us/garage/project-details.aspx?project=sightsign>, (2017), 18 pgs.

* cited by examiner

SIGNING WITH YOUR EYES

BACKGROUND

Signatures may be used to legally bind individuals in contracts, give consent, and offer the chance to provide a memento for an admirer in the form of an autograph. Signatures may be digitally attached to digital documents, or may be attached to physical items. Disabled persons who have difficulty utilizing their hands or arms face challenges providing a signature.

SUMMARY

Embodiments pertain to providing mechanisms for disabled and other persons to affix a signature to electronic items as well as physical items. Some embodiments relate to providing for the ability for disabled persons to sign based upon the detected gaze of their eyes. Some embodiments relate to providing the ability to modify the signature, thereby more closely resembling a hand-drawn signature. For example, the system may display a visual representation of a component of a signature of a user on a display screen, the visual representation of the component of the signature of the user may be determined by a plurality of control points. The system may display an indicator proximate a particular control point of the plurality of control points on the display screen. The system may then detect that the user has registered the particular control point by receiving an input at a set of coordinates that is within a predetermined threshold distance of the particular control point, the input received from an input device; and responsive to detecting that the user has registered the particular control point, modifying the control point based upon the set of coordinates and modifying the visual representation on the display of the component of the signature based upon the modified control point and outputting an indication that the user has agreed to sign the object.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
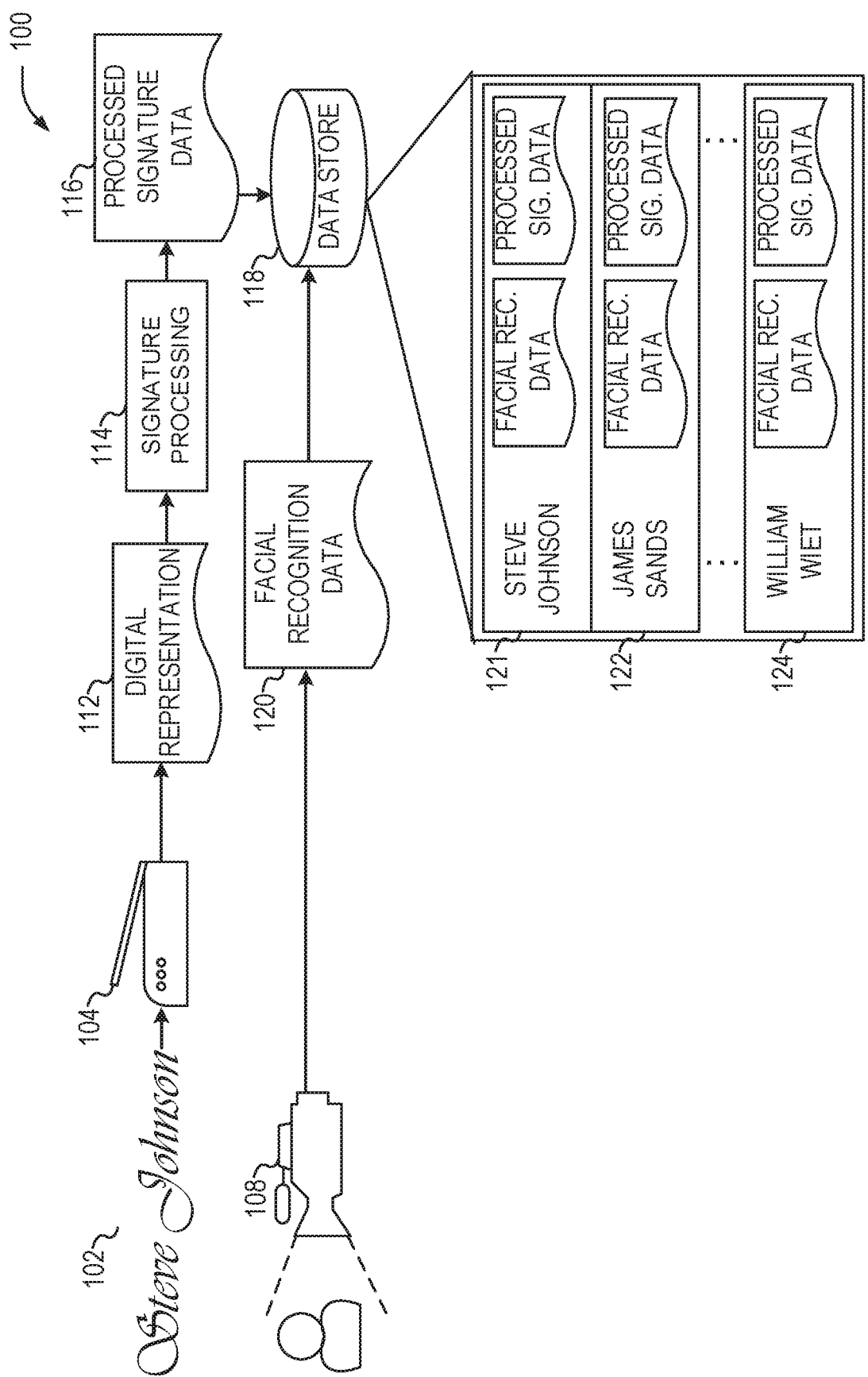
FIG. 1 shows a diagram of an onboarding process to setup an eye-based signature system according to some examples of the present disclosure.

Technology such as gaze trackers may be utilized to assist disabled users in signing documents with their eyes. A signature of the user (e.g., from before the disability or otherwise obtained) is displayed and a user is instructed to follow an indicator (e.g., a graphical dot) as it traces the user's signature on the screen. An eye tracking device measures the user's gaze location in comparison with the indicator as it traverses the signature. If the gaze is substantially close enough to the indicator throughout its travel, the signature may be said to have been completed. The signature is then reproduced as it was displayed on the screen and is the same each time the user signs. For signatures placed on physical items, the signature may then be converted to instructions to move a robotic arm with a pen to sign the physical item. For electronic documents, an indication or acceptance may be registered or a graphic of the signature may be affixed to or associated with the electronic document.

Measuring the user's gaze location in comparison with an indicator does not necessarily provide an accurate level of authentication to ensure that the user is who they say they are. Additionally, while a traditional hand-written signature has natural variations, the signature produced by this method produces the same signature each time the user signs. One possible solution to the latter problem is to utilize the displayed signature as a guide and use the actual path of the eyes in following the indicator as detected by the gaze tracker as the signature. This would introduce variability in the signature as the eyes would not follow the displayed signature exactly the same way twice. The results from following the eye gaze may not be satisfactory as the human eye does not have enough control to achieve an acceptably smooth signature. For example, the eye may jump between points and produce unacceptably jaggy edges.

Disclosed in some examples are methods, systems, devices, and machine-readable medium that provide a method for providing more natural signatures using input devices such as gaze tracking, A user's signature may be decomposed into one or more components. As an example, the components may be one or more letters of the signature, or a portion of a letter, or the like. Component may be described using one or more control points. A user may sign with their eyes by focusing their gaze on a set of these control points that make up the signature (or portion of the signature). If the user's gaze is within a threshold distance from each control point in the set, the signature may be validated. Moreover, by modifying the control points based upon the actual gaze location (which is within the threshold distance), the signature may be slightly modified. For example, the signature may be decomposed into one or more component Bezier (or other parametric) curves and the user may be asked to focus on control points of the one or more Bezier curves. Modifying the control points of a Bezier curve slightly still produces a smooth curve, but introduces natural variations.

These methods, systems, devices, and machine-readable mediums may also provide for authentication through an additional biometric. For example, facial recognition technologies (such as MICROSOFT® WINDOWS® HELLO®) may be combined with signature capabilities to confirm identity. In these examples, a particular user may first authenticate through facial or vocal recognition technologies before being allowed to sign.

In yet other examples, the examples described herein may be used in other contexts where additional verification of a handwritten signature is desired. For example, a person's signature may be converted to processed signature data (e.g., a series of control points) and stored. Later, a party may compare a sample signature to the stored signature by converting the sample signature into a second set of processed signature data. This second set of processed signature data may be compared to the stored processed signature data of the person. If the match is close enough, the sample signature may be authenticated as the person's signature. For example, a customer opens a bank account and enters his official signature into the banks records. The bank can then encode the signature as a series of control points and store it. Then when the customer conducts a transaction with the bank that involves a signature, (e.g. deposit a check) that signature can then be decomposed into a series of control points and compared against their existing control point sequence and the difference between the two may be quantified. The bank can then establish some minimum error level above which the signature is considered invalid.

Turning now to FIG. 1 a diagram 100 of an onboarding process to set up an eye-based signature system is shown according to some examples of the present disclosure. A user's signature 102 may be converted into a digital representation 112 using a device 104. Device 104, as shown is a scanner, but in other examples may be a digital camera, or other device. The signature may be obtained from before a user's disability. The digital representation 112 may be an image file such as a Graphical Interchange Format (GIF), a Joint Photographic Experts Group (JPEG) format, or the like.

Additionally, the user's face may be captured by image capture device 108. Facial recognition data 120 may be calculated (e.g., by a computing device). In some examples, the device 104 and image capture device 108 may be communicatively coupled to a computing device, but in other examples one or both may be part of a computing device. Digital representation 112 may be processed by signature processing 114 which may produce processed signature data 116 which may be stored in a data store 118 along with the facial recognition data 120.

In some examples, signature processing 114 may break the signature into one or more components, such as Bezier curves (e.g., a cubic, or other order Bezier curve) with control points. The control points may mathematically describe the components. When the components are rendered to a screen, the control points may determine the visual representation of the component on the screen. In these examples, the processed signature data 116 may comprise the control points (or other component descriptors) for each component along with position and orientation information (e.g., the order of each curve in making up the signature). The signature processing 114 may be part of a computing device of a user or may be part of a computing device of a network-based signature service. A network-based signature service may store signatures and facial recognition data, such as shown for data store 118 for use by a number of client computing devices.

In some examples, the data store 118 may be local to a user's computing device and may store the facial recognition data 120 and processed signature data 116 of the local users of the computing device. In some examples, the data store 118 may be remote, for example as part of a network-based signature service and may store multiple facial recognition and processed signatures for multiple users on multiple computing devices. In either case, the data store 118 may store records for multiple users 121, 122, and 124. Although three users are shown in FIG. 1, fewer than three or more than three may be stored. The records may store facial recognition data and processed signature data for the user. In some examples, multiple processed signatures may be stored for a user. For example, a user may have different signature styles for different purposes (e.g., legal documents vs. autographs, and the like).

Figure 2:
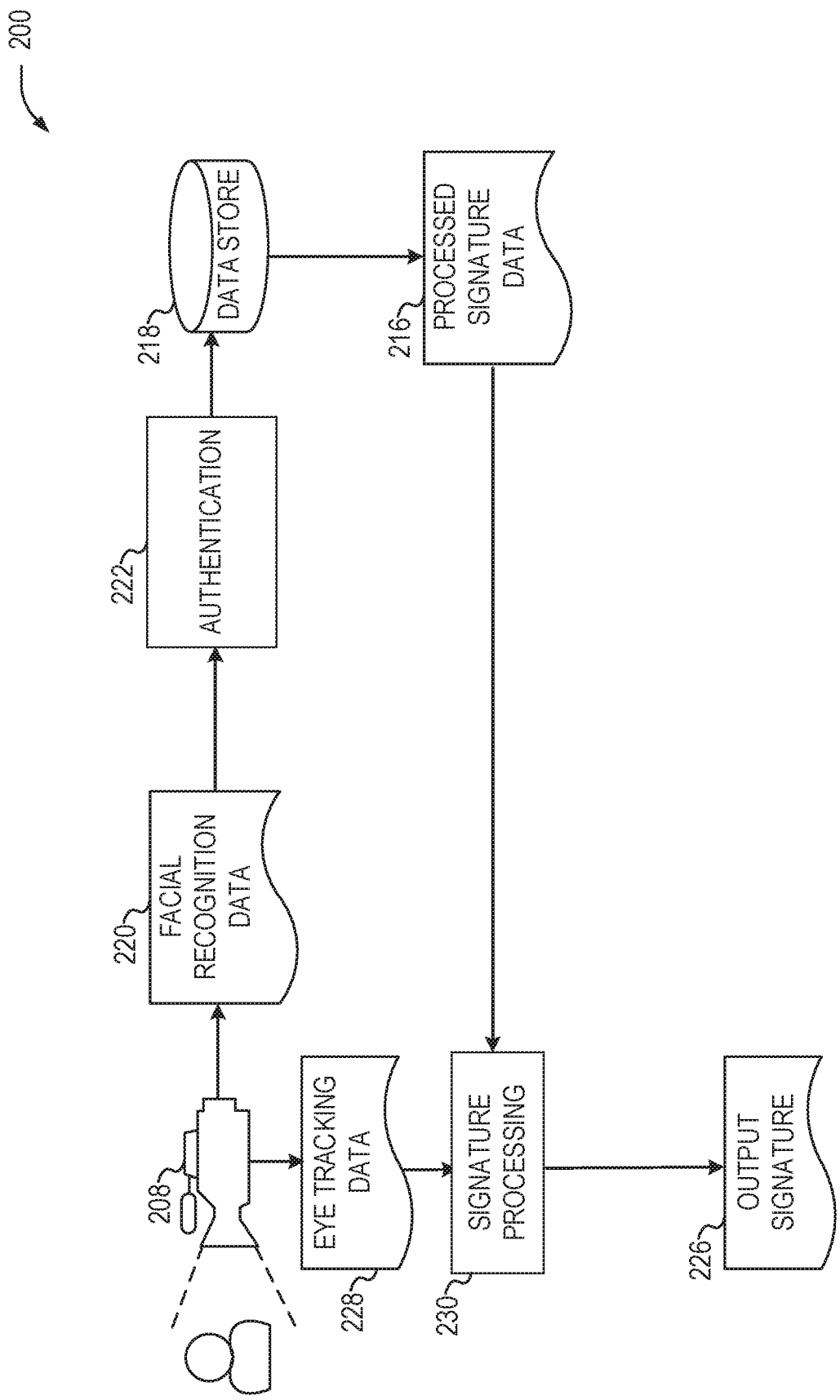
FIG. 2 shows a diagram of a signing process according to some examples of the present disclosure.

FIG. 2 shows a diagram 200 of a signing process according to some examples of the present disclosure. In some examples, the components of FIG. 2 are an example of the components of FIG. 1. Image capture device 208 records fresh facial recognition data of the user and uses the facial recognition data to authenticate the user 222. For example, by comparing the facial recognition data 220 to stored facial recognition data corresponding to the user in the data store 218. If the facial recognition data 220 matches the stored facial authentication data of the user, then the processed signature data 216 may be used by a computing device along with eye tracking data 228 from the image capture device 208 (or from another device) to complete the signature processing 230 to produce an output signature 226. The output signature 226 may be a digital indication that a digital document was signed, may be a digital representation of a signature (e.g., a JPEG, GIF, or other file), may be an output vector representation, or may be instructions for an external device (e.g., a robot arm) for producing a physical signature on a physical object. The output signature 226 may be a modified version of the signature produced by the processed signature data 216.

As previously noted, the signing process may include gazing at a set of control points of a visual representation of the signature (either a subset of the control points or all the control points) and in some examples utilizing differences between the control points and the gaze point to adjust the signature and moving control points of Bezier curves. In some examples, the signing process includes the ability of the user to choose an orientation of the signature and scale (adjust the size) of the signature. For example, the signature may be horizontal, vertical, skewed, or otherwise oriented. For example, the signature may be bordered by a parallelogram and the user may re-orient and scale the signature by moving the corner points of the parallelogram.

Figure 3:
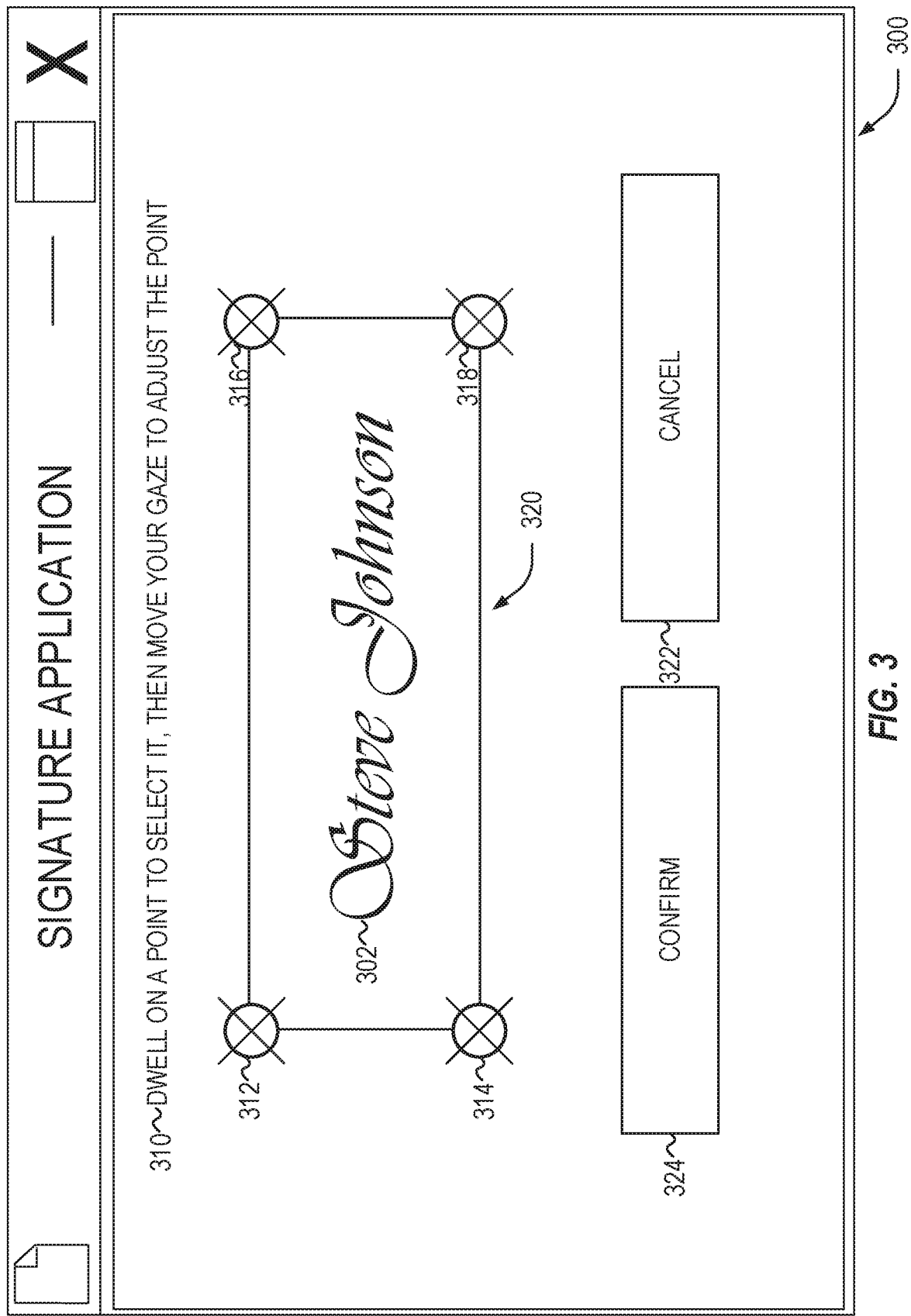
FIG. 3 shows an example Graphical User Interface (GUI) for adjusting the orientation of a signature according to some examples of the present disclosure.
Figure 4:
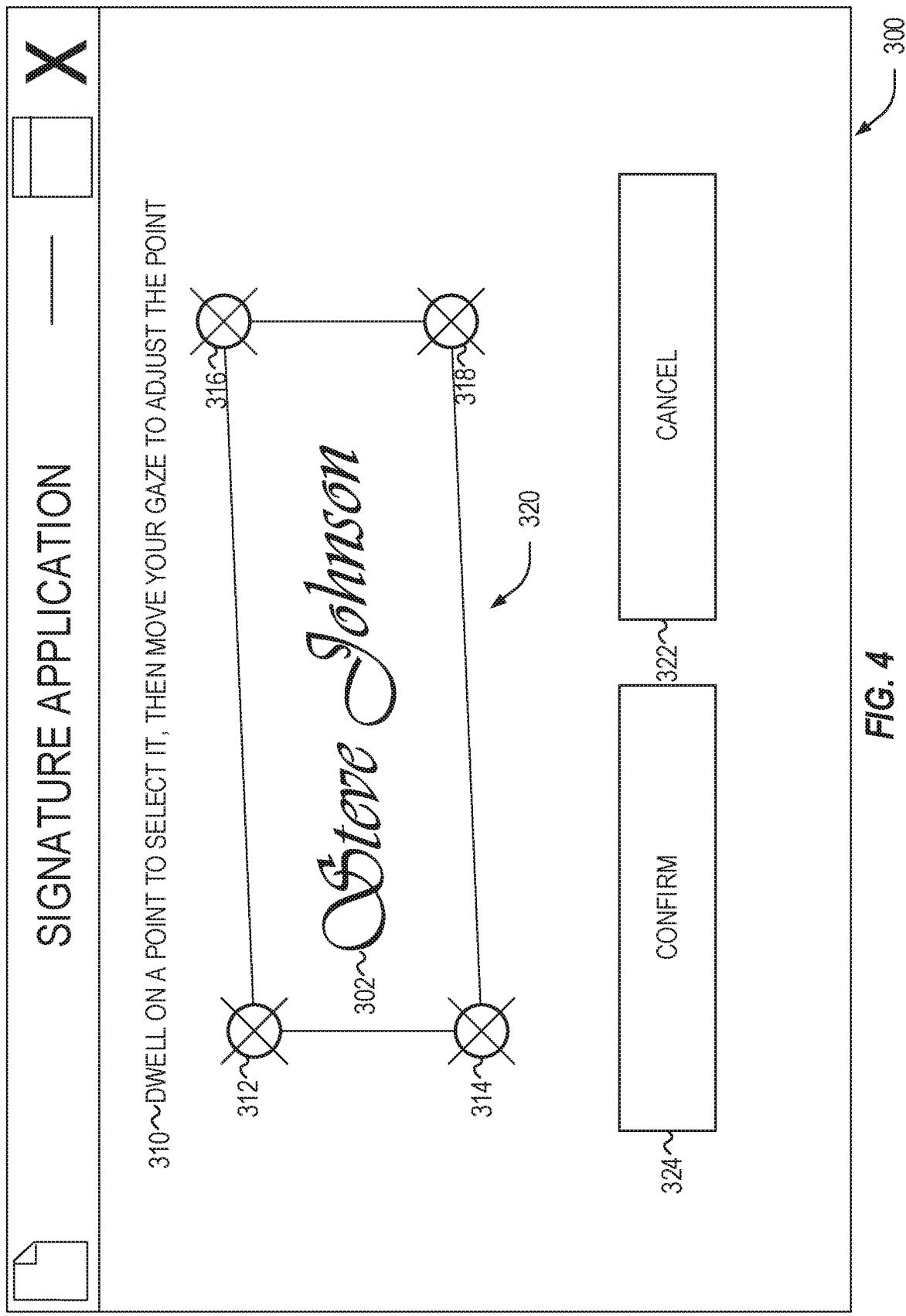
FIG. 4 shows the GUI of FIG. 3 with control points moved upwards, tilting a signature upwards according to some examples of the present disclosure.

FIG. 3 shows an example Graphical User Interface (GUI) 300 for adjusting the orientation of a signature. The process of adjusting the orientation may be done before, or after the signing process. GUI 300 may include instructions 310 and four positioning points 312, 314, 316, and 318. Positioning points 312, 314, 316, and 318 form four corners of a parallelogram 320 surrounding signature 302. Button 324 allows for the user to confirm the orientation and size of the signature and button 322 allows the user to cancel. The system may utilize a gaze tracker to determine that the user has fixated within a threshold distance of a particular one of positioning points 312-318 for a particular amount of time. The particular point may then be highlighted and moved by the user by moving their eyes toward the desired destination point. FIG. 4 shows the GUI 300 of FIG. 3 with positioning points 316 and 318 moved upwards, tilting signature 302 upwards. The four positioning points 312, 314, 316, and 318 may be used to move, tilt, rotate, skew, and resize the signature 302. For example, by moving all four positioning points, the signature may be moved. By moving only one or two positioning points the signature may be stretched or resized. By rotating the positioning points about the center of the signature, the signature may be rotated. In some examples, to aid in properly positioning the signature, an image of the item to be signed may be transposed behind the signature.

Once the orientation and size of the signature are determined and the user is ready to sign (e.g., the user has reviewed the documents or is otherwise ready), the user may begin the signing process. As noted previously, the signature is broken into one or more components, such as Bezier curves. The signature process presents a sequence of one or more (or all) control points of one or more (or all) of these components to the user. The sequence may be selected from the control points of the constituent curves of the user's signature. The order of the sequence may be selected such that control points of a same curve are presented in sequence, and the order of the curves with respect to other constituent curves may be selected such that curves constituting a same letter may be presented in sequence. Letters may be ordered such that a left to right or a right to left flow may be presented. In some examples, all the control points of a signature may be presented and the user may determine the order of the sequence by utilizing their eyes to select the sequence of control points. In this case, the order that the control points are selected by the user determines the sequence.

Figure 5:
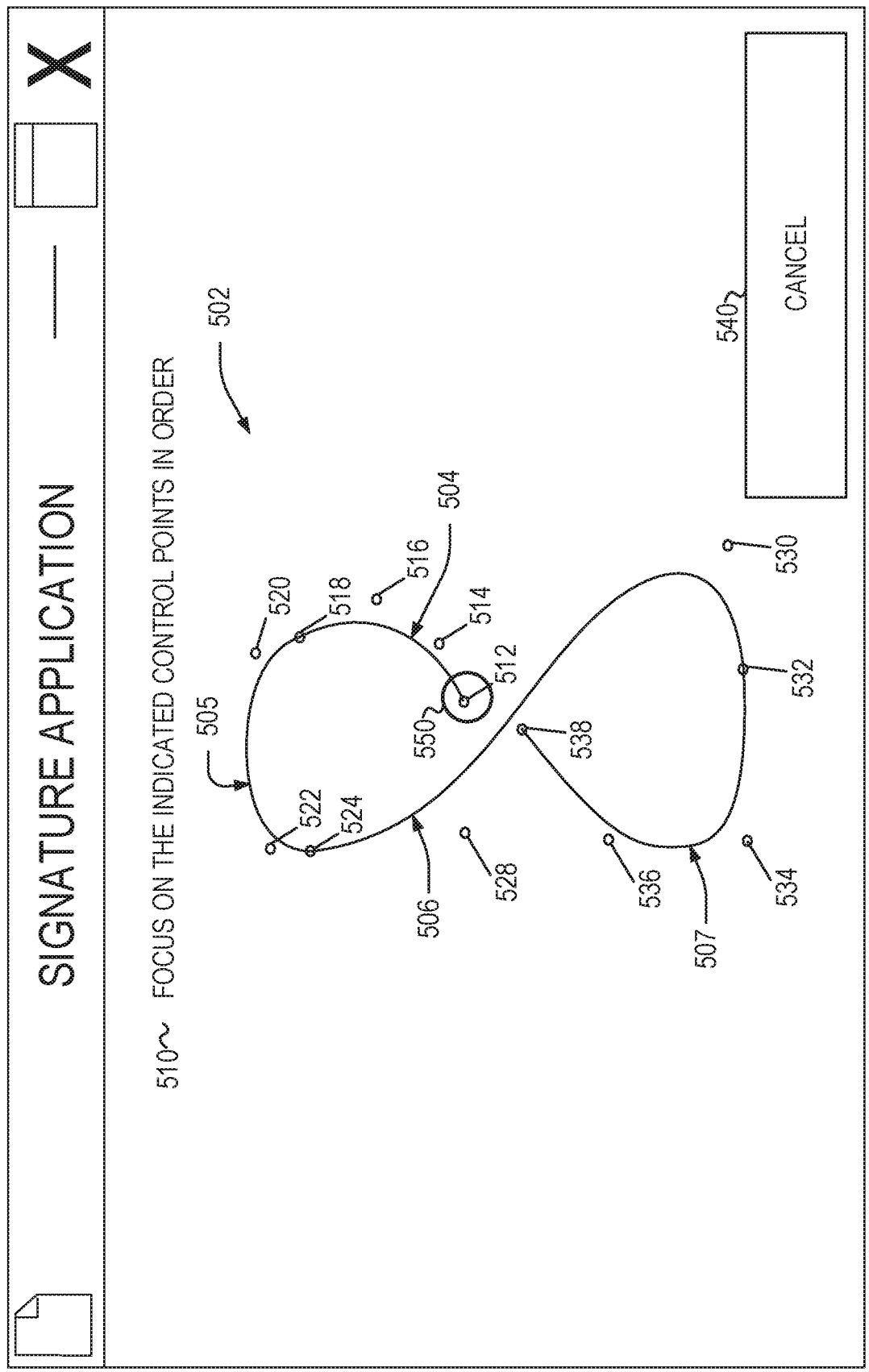
FIG. 5 shows a diagram of a GUI of a signing sequence according to some examples of the present disclosure.

FIG. 5 shows a diagram of a GUI 500 presented as part of a signing sequence according to some examples of the present disclosure. For clarity, FIG. 5 displays a part of a signature 502, but in other examples, an entire signature may be displayed at the same time. Instructions 510 may instruct the user on how to complete the signature process. Signature portion 502 contains four constituent component curves: curves 504, 505, 506, and 507. Each curve contains four control points, a start and end control point and two middle control points. For example, curve 504 starts at control point 512, and ends with control point 518 with middle control points 514 and 516. Curve 505 has starting control point 518 and ending control point 524 with middle control points 520 and 522. Curve 506 has starting control point 524, ending control point 532, and middle control points 528 and 530. Curve 507 has starting control point 532, ending control point 538 and middle control points 534 and 536. Indicator 550 may be placed upon the start of the signature portion 502 (which depicts a cursive S) over or proximate control point 512. As shown, curves may have overlapping control points (e.g., the last control point of curve 504 is the first control point of curve 505, and so on).

To sign, the user then registers with each control point in the predetermined sequence of control points. To register a control point the gaze tracker detects that the user is gazing within a predetermined distance of the control point center. In some examples, the gaze must be held for a predetermined amount of dwell time. In some examples, the user has a predetermined amount of time (greater than the dwell time) to register a control point before the signature is canceled.

Figure 6:
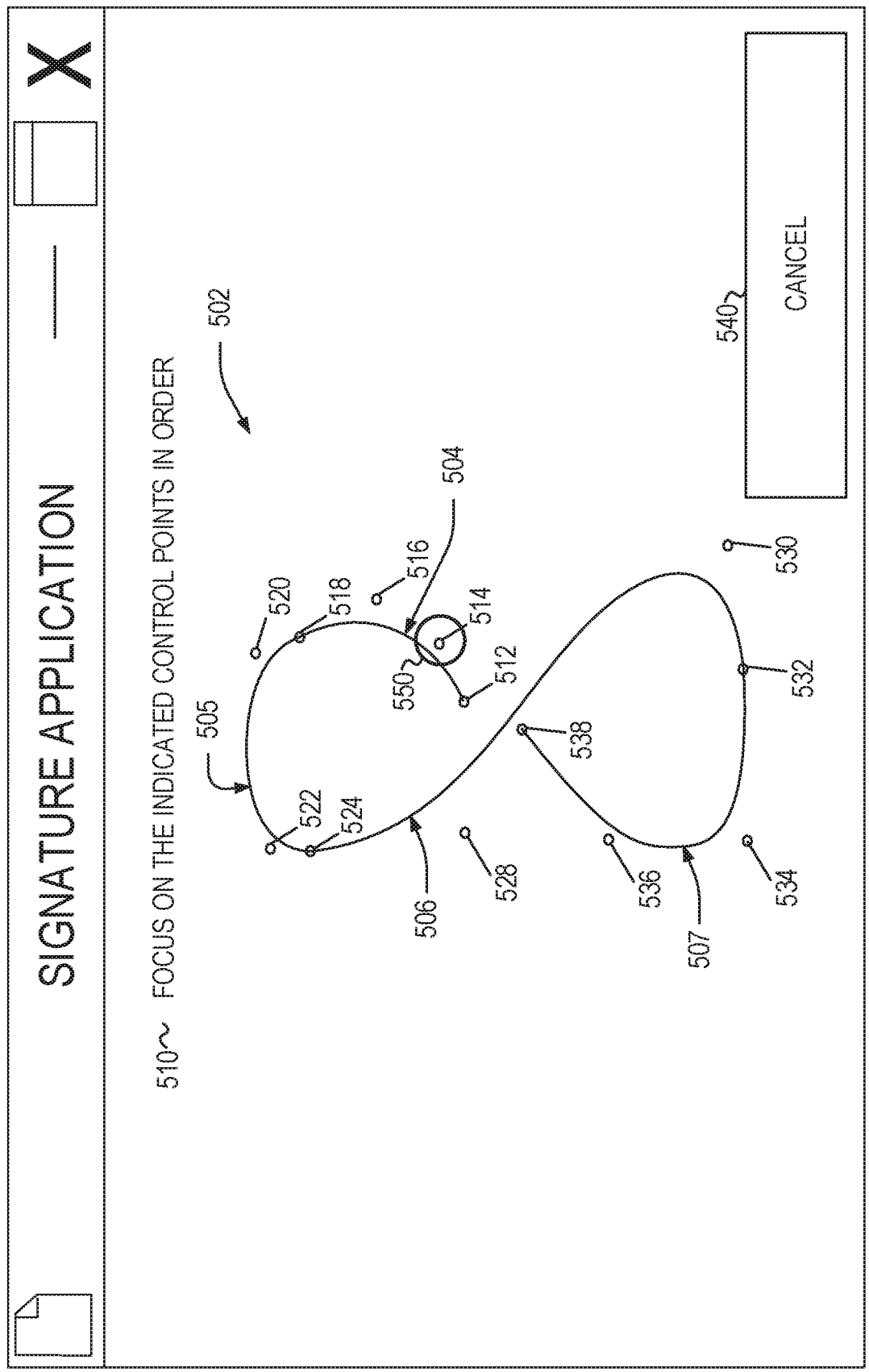
FIGS. 6-7 show diagrams of the GUI with the indicator advanced to various different control points according to some examples of the present disclosure.
Figure 7:
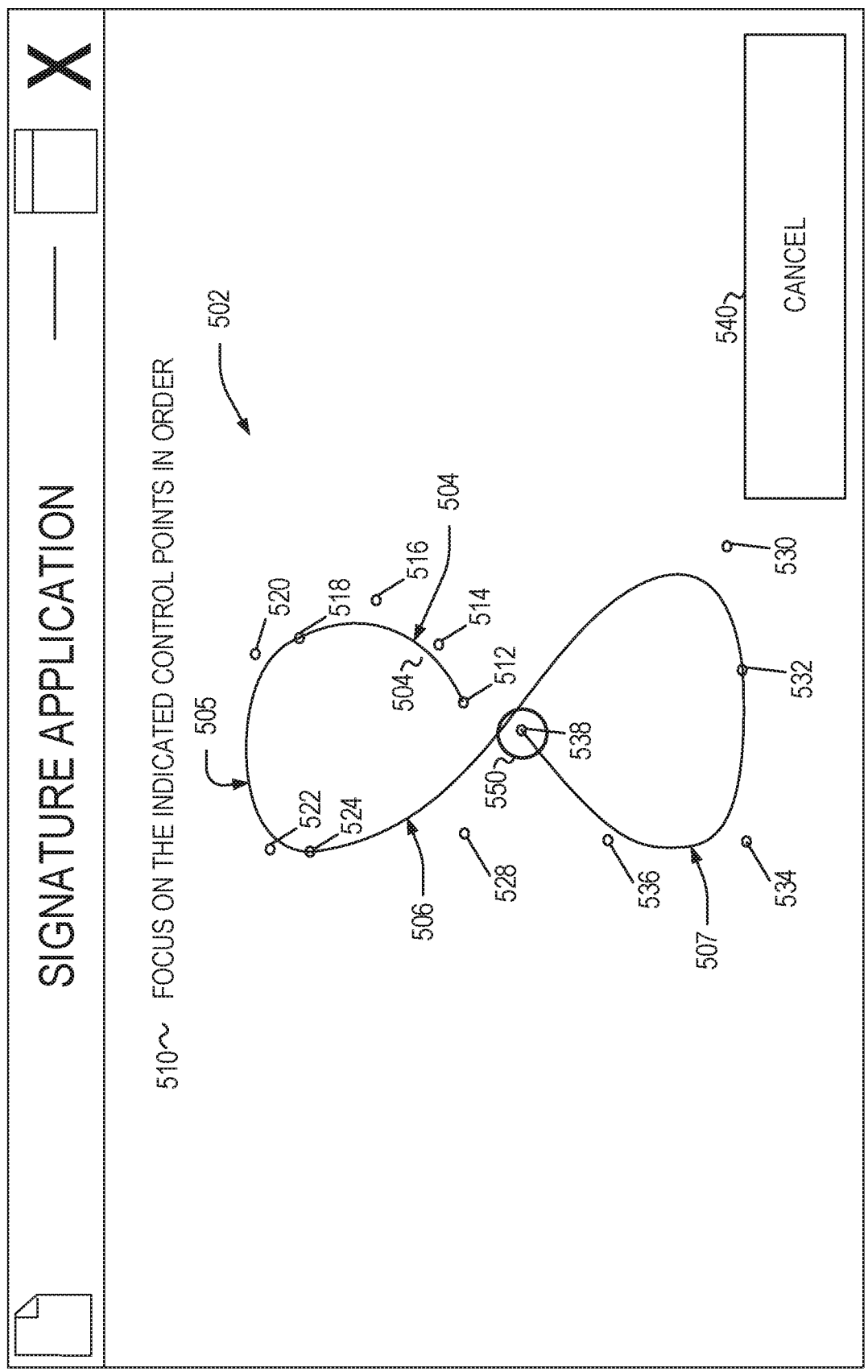

For example, in FIG. 5, the process of signing may start when the user registers control point 512 (in some examples, there is no time limit for registering the first control point). Once the user registers control point 512, the indicator 550 advances to the next control point 514. FIG. 6 shows a diagram of the GUI 500 with the indicator 550 advanced to control point 514. The system may then set a maximum time that the user has to register control point 514. If the user's gaze does not fall into the predetermined radius of the control point 514 (and for the predetermined dwell time in some examples) before the timer expires, the system may cancel the signature. Once a control point is registered (in some examples within the predetermined time) the system advances to the next control point and resets the timer. FIG. 7 shows a diagram of the GUI 500 with the indicator advanced to control point 538. Once control point 538 is registered, if this is the last curve in the signature, the signature may be considered accepted. If there are additional curves, the system may display those curves and start registering control points of those curves.

In some examples, the user may be required to register all the control points calculated for a signature. In other examples, the user may register only a subset of all the control points for a signature. Cancel button 540 may be registered at any time to cancel this process.

As noted previously, registering a control point involves gazing within a predetermined threshold distance of a control point, and in some examples, maintaining that gaze within that distance for a minimum dwell time. The gaze location may then be compared with the currently indicated control point to determine a distance. If the distance is within the threshold distance, the control point may be registered. If the distance between the control point and the gaze location is greater than zero, but still within the threshold, then the control point may be moved towards the gaze location. For example, the control point may be moved to the actual gaze location. The curve(s) may then be recalculated according to the new control points. The amount of variance of the signature components may be controlled by the threshold distance needed to register a control point. Thus, the control point may move by a maximum of the threshold distance to register a point. The amount of variance may also be adjusted by inputting the actual gaze location into a function that determines a new control point.

Figure 8:
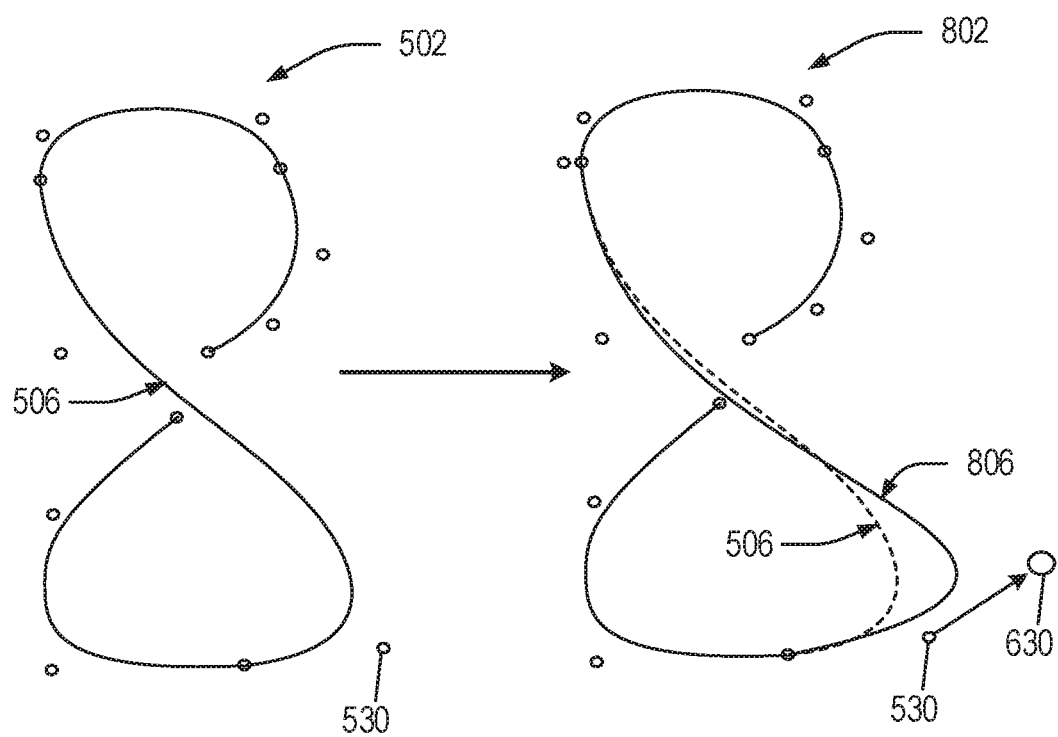
FIG. 8 shows a modification of a signature portion according to some examples of the present disclosure.

For example, FIG. 8 shows a modification of the signature portion 502 to be signature portion 802. The curve is a cubic Bezier curve. In this example, the user is trying to register control point 530. The gaze location is 630, which is up and to the right of the actual location of control point 530. If the gaze location 630 is still within the predetermined threshold of control point 530, the control point may be registered, but the location of the control point may be adjusted to be at gaze location 630. The new curve 806 is shown as a solid line whereas the old curve 506 is shown as a dotted line. As shown in FIG. 8, the new control point is moved to the gaze location, however, the control point may be moved in other ways based upon the gaze location, such as by applying a mathematical function involving the gaze location, the control point, or the like. For example, the new control point may be halfway between the control point 530 and the gaze location 630.

By applying these techniques, it provides users of alternative input techniques the ability to have digital signatures that more closely resemble handwritten signatures in that they have natural variations. While eye gaze was discussed herein, one of ordinary skill in the art with the benefit of Applicant's disclosure will appreciate that other input devices may be utilized. For example, a mouse, a stylus, a sip-and-puff device, a mouth stick, or the like. In addition, while this disclosure has been described in terms of use for the disabled, the disclosure may be utilized for other purposes. For example, the techniques herein may be performed by users as a means of providing an electronic signature that provides minor variations and/or where a greater indication of legal assent to an agreement is desired.

Figure 9:
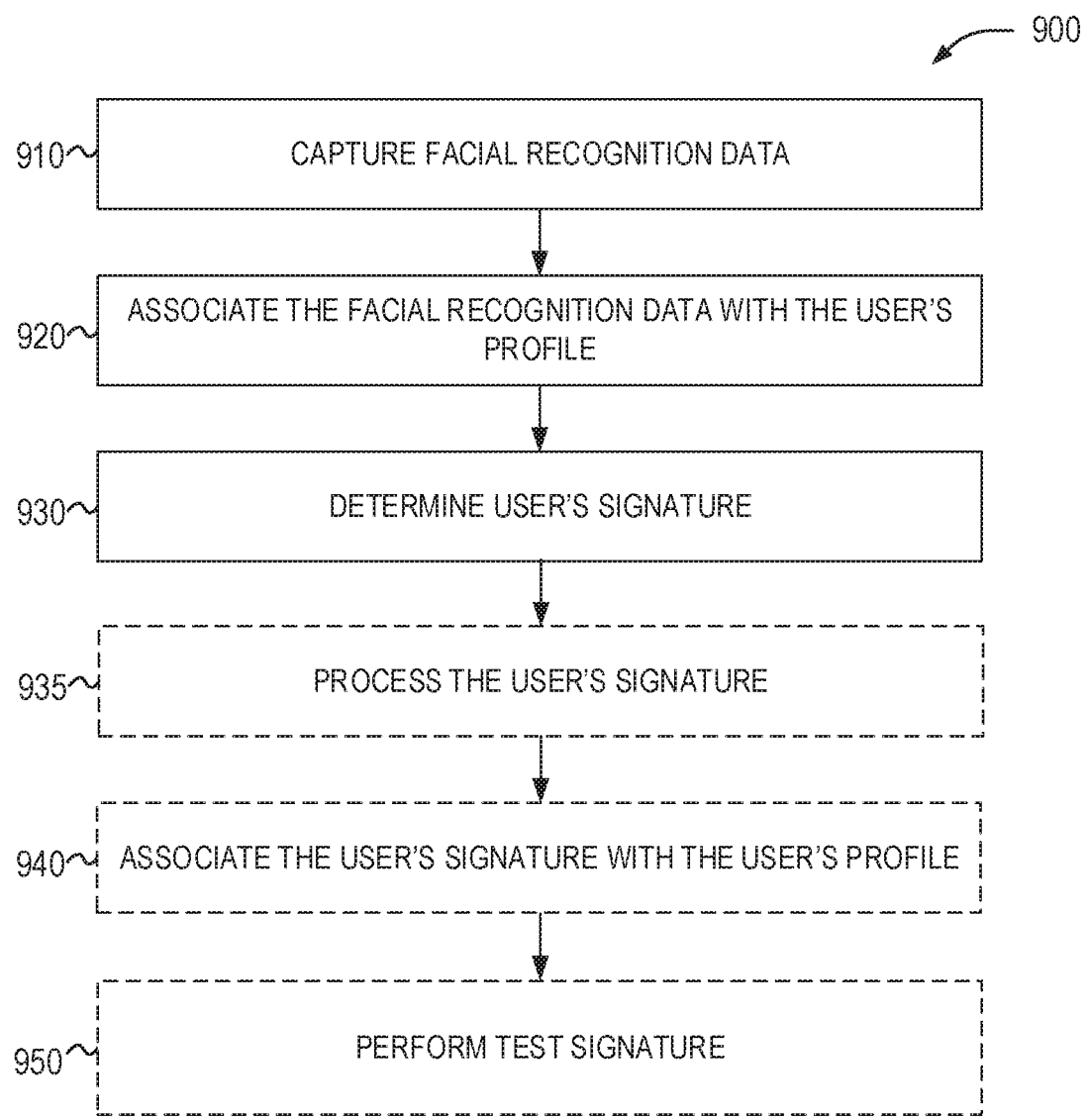
FIG. 9 shows a flowchart of a method of a computing device registering a user for signing with their eyes according to some examples of the present disclosure.

Turning now to FIG. 9 a flowchart of a method 900 of a computing device registering a user for signing with their eyes is shown according to some examples of the present disclosure. At operation 910 facial recognition data may be captured. For example, images of the user may be captured and turned into facial recognition data, e.g., a representation vector of the user's facial identity. At operation 920 the facial recognition data may be associated with the user's profile on the system. In some examples, this includes storing the facial recognition data in a database (such as data store 118 from FIG. 1) that may be local to the computing device of the user (e.g., a hard drive of the user) or may include sending the facial recognition data to a network-based signature service over a network connection.

At operation 930 the user's signature may be determined. For example, by converting a physical signature into a digital representation of that signature. The digital representation may be retrieved from the user's profile in the system, in an example. Optionally, at operation 935, the signature may be processed at the computing device to produce a processed signature. In other examples the signature may be processed at the network-based signature service. Processing a signature may comprise decomposing the signature into one or more components, such as one or more Bezier curves. The processed signature data may comprise control points for these curves and ordering information specifying ordering of the curves. More details on one example method of decomposing the signature into one or more components will be described later.

At operation 940 the signature may be associated with the user's profile. For example, storing the processed signature (either as processed by the user's computing device or as received by the remote signature service) in a data store (such as data store 118, 218) that may be local to the computing device of the user (e.g., a hard drive of the user) or may include sending the processed signature data to a network-based signature service over a network connection. Operation 935 may be performed at the computing device or may be performed at the network-based signature service. Similarly, operation 940 may be performed at the computing device or may be performed at the network-based signature service. At operation 950 the system may optionally perform a test signature which will utilize the operations of FIG. 10. If the test signature completes successfully (or is not performed), the user may now use the system normally.

Figure 10:
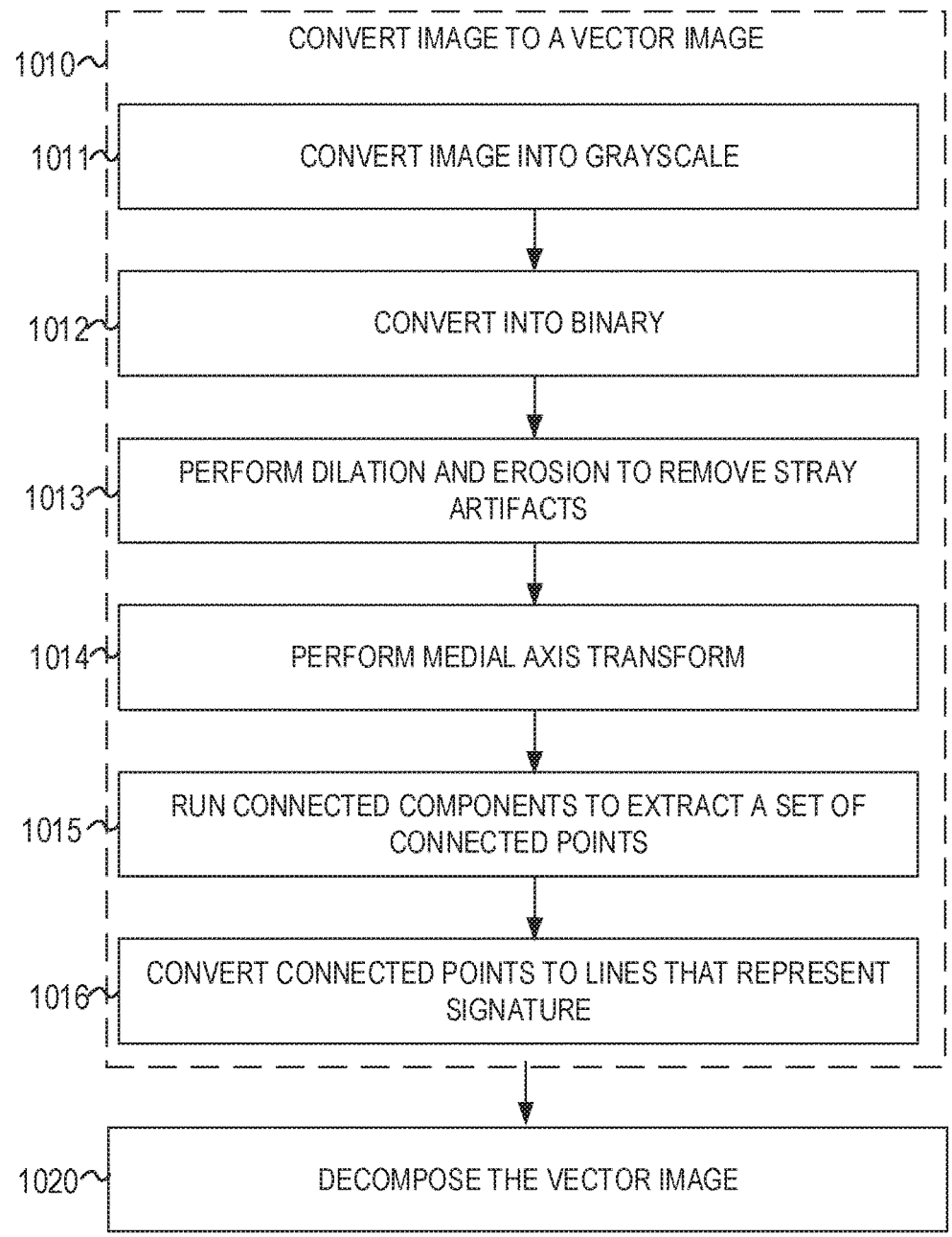
FIG. 10 shows a flowchart of a method of processing the user's signature according to some examples of the present disclosure.

FIG. 10 shows a flowchart of an example method of performing operation 935 to process the user's signature according to some examples of the present disclosure. At operation 1010, if the image was scanned or otherwise capture in a form that is not already considered a vector image, the image may be converted to a vector image. In some examples, this may be accomplished by performing operations 1011-1016. At operation 1011 the image may be converted into grayscale using an appropriate threshold. At operation 1012 the grayscale image may then be converted to a binary image, again, using an appropriate threshold. At operation 1013 a combination of dilation and erosion may be performed to remove stray artifacts and thin the image. At operation 1014 the system may perform a medial axis transform to extract the skeleton of the image. At operation 1015 the system may run a connected components algorithm to extract a set of connected points. At operation 1016 the system converts the set of connected points into a set of lines that represent the signature. These lines may be stored as path data for the signature. At operation 1020 the vector image (either as scanned in, or as converted at operation 1010) may be decomposed into one or more components to form the processed signature.

Figure 11:
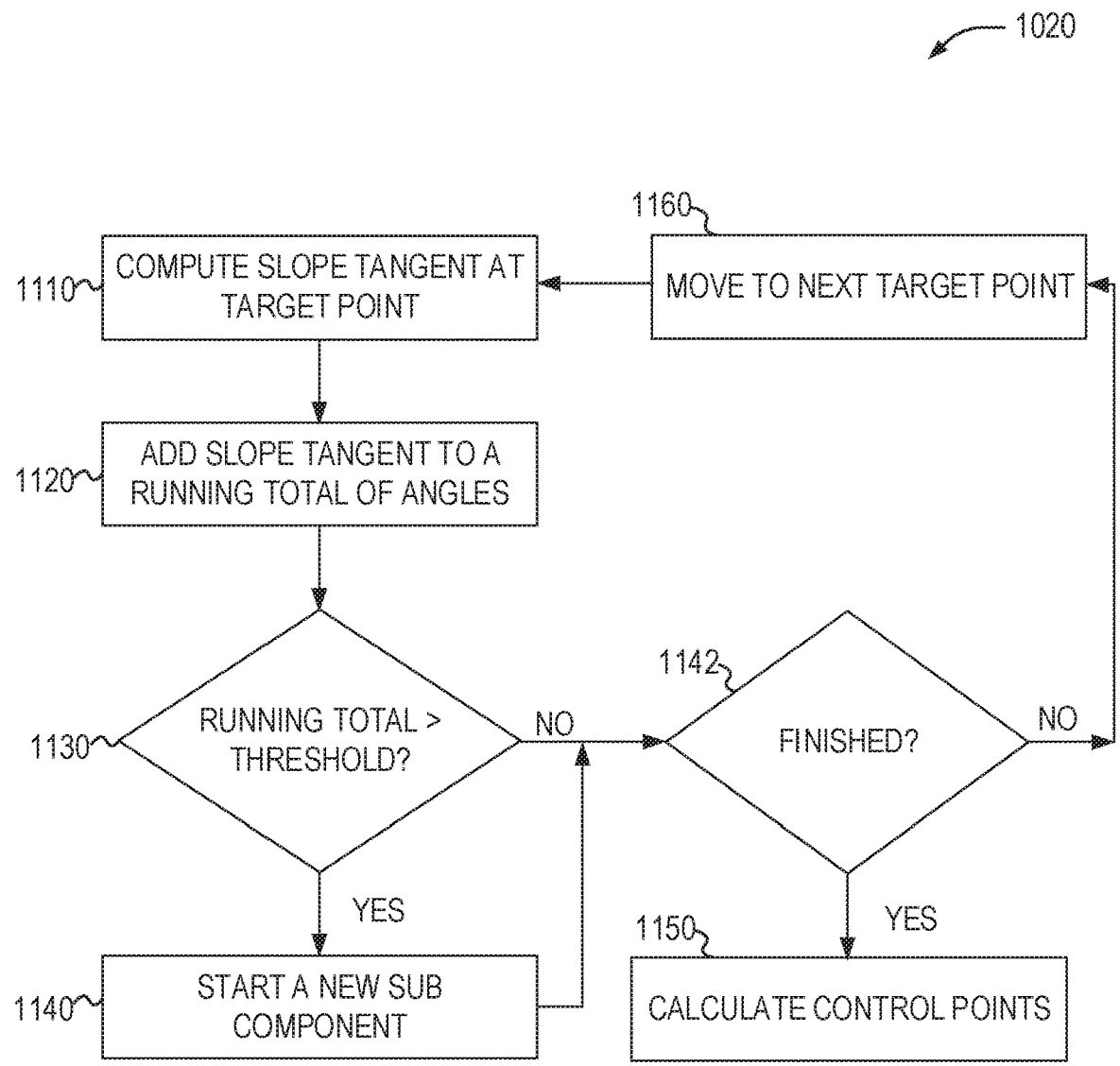
FIG. 11 shows a flowchart of a method of decomposing the vector image into one or more components is shown according to some examples of the present disclosure.

Turning now to FIG. 11, a flowchart of a method of performing operation 1020 to decompose the vector image into one or more components is shown according to some examples of the present disclosure. In some examples, the components may be a set of one or more Bezier curves. Bezier curves belong to a family of parametric curves that can be used to describe smooth curves on a plane. Bezier curves can be of any order, but in some examples, may be linked quadratic or cubic Bezier curves. The shape of each curve is determined by a starting and ending point and one control point in the case of quadratic Bezier curves and two control points in the case of cubic Bezier curves. The curve passes through the start and end points but not through the control points. The intermediate points of the curve are determined by interpolating between the end points and the control points using the parametric equations. To determine curves of a signature, given a curve determined by a set of points, the system breaks the curve into a set of smaller but linked curves, and determines the control points of the smaller curves.

At operation 1110 a target point (i) on the signature may be initially set to be the second point on the curve. The slope tangent at the target point is then computed. For example, let two consecutive points be defined by $P_{i-1}=[x_{i-1}, y_{i-1}]$ and $P_i=[x_i, y_i]$ then the slope of the tangent at $P_i$ is defined by:

$$\tan\theta = \frac{\Delta y}{\Delta x} = \frac{y_i - y_{i-1}}{x_i - x_{i-1}}$$

At operation 1120 the system adds the computed slope tangent to a running total of angles between successive tangents for the current component. At operation 1130, a comparison is made between the running total and a threshold and if the running total exceeds the threshold, the system starts a new component at operation 1140. For example, information about which points in the digital signature are included in the component may be recorded in a data structure and the running total of slope tangents may be reset. A component may be defined by a start and end point. At operation 1142 a determination is made as to whether all points in the signature have been processed. If yes, then at operation 1150 the control points may be calculated for the determined components. If no, then at operation 1160, the system advances to the next target point i and flow starts again at operation 1110.

As noted, at operation 1150 control points may be calculated for the components. Given the start and end points $P_0$ and $P_1$, to calculate the remaining control point $C_0$ for quadratic Bezier curves and if the system is calculating cubic Bezier curves the remaining control points, $C_0$ and $C_1$ the system will define three additional points along the component:

H that is at half the distance from the starting point as from the end point of the component, q that is a quarter of the distance from the starting point of the component.

Q that is at three quarters of the distance from the starting point of the component.

For a quadratic Bezier curve, the control point $C_0$ can be calculated as:

$$C_0 = \frac{4H - P_0 - P_1}{2}$$

For a cubic Bezier curve, the control points $C_0$ and $C_1$ may be calculated to be:

$$C_0 = \frac{24q - 10P_0 + 3P_1 - 8Q}{9}$$

$$C_1 = \frac{24Q + 3P_0 - 10P_1 - 8q}{9}$$

In FIG. 11, the running total of slope tangents was compared to a threshold value. The threshold is a heuristic to determine whether a given curve can be successfully approximated by a Bezier segment within a margin of error. In one example, a global threshold may be determined for the entire signature. For example, a threshold slightly less than $\pi/2$ works in most cases for both quadratic Bezier curves and cubic Bezier curves.

In other examples, using an interactive process, it is possible to set different thresholds for different portions of the source signature. For example, the system may iteratively try all possible thresholds between 0 and $2\pi$ for all sections of the curve between the current point and all the remaining points of the curve in small increments of $\Delta\theta$. For example, if we are at point $P_i$, compute the control points for all sections of the curve between $P_i$ and $P_n$ for all thresholds between 0 and $2\pi$. Regenerate the segment for each section of the curve based on the control points calculated and compute the error between the original curve and the generated curve and pick the curve that generates the lowest error that uses a threshold greater than $\pi/2$. By iteratively calculating the threshold, a good balance between number of segments used and the error of the generated curves may be obtained.

Figure 12:
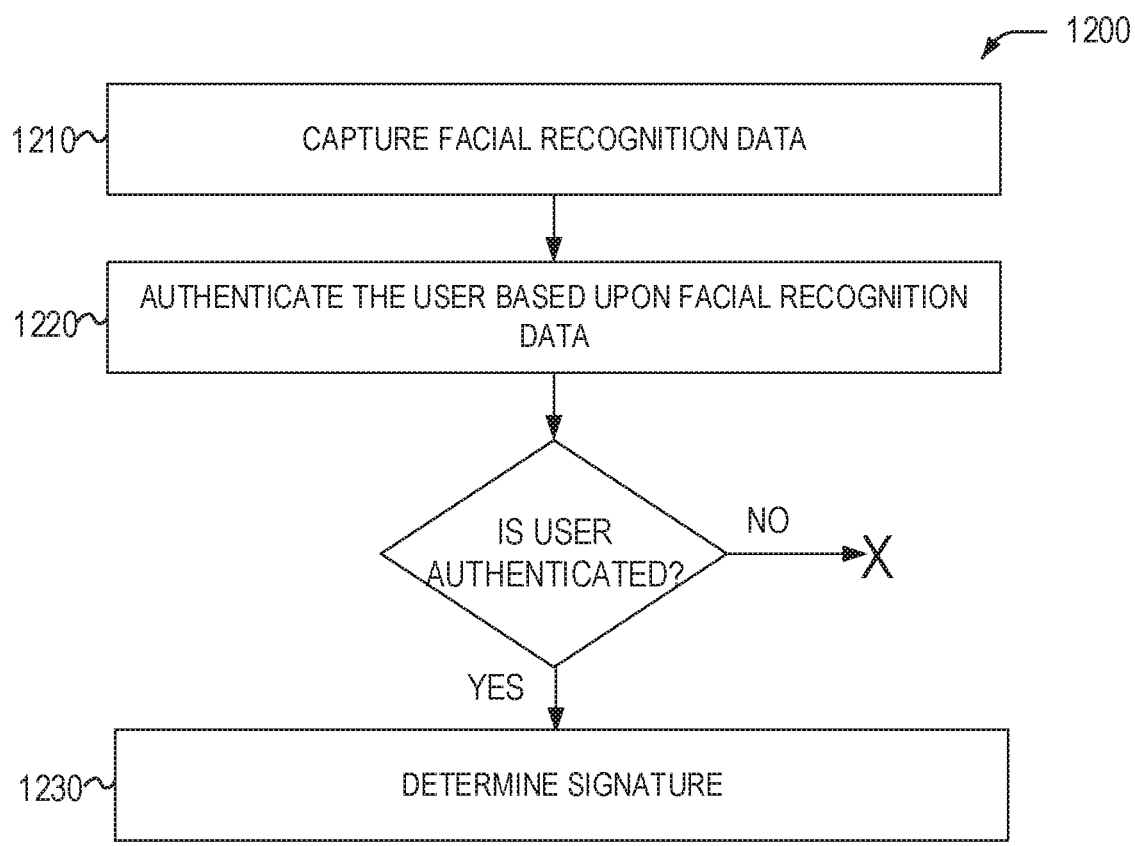
FIG. 12 shows a flowchart of a method of authenticating the user prior to signing according to some examples of the present disclosure.

FIG. 12 shows a flowchart of an example method 1200 of authenticating the user prior to signing according to some examples of the present disclosure. Method 1200 may be performed at a network-based signature service or at a user's computing device. At operation 1210 the system may receive or capture facial recognition data (e.g., a representation vector). For example, a video capture device may capture images of the user. The system may find the user's face in the image data, locate facial landmark points, ensure that the user's head orientation is correct, and generated a representation vector. A representation vector uses the landmark locations as anchor points and comprises samples from different areas of the face. The representation vector at its most basic form may be a histogram representing the light and dark differences around specific points. At operation 1220 the facial recognition data may be utilized with stored facial recognition data (taken when registering for the system) in order to authenticate the user. For example, a current representation vector of the user may be compared with a stored representation vector of the user taken during registration with the system. If the similarity between the current and stored representation vectors are high enough (e.g., based upon a machine-learned threshold), the user may be authenticated.

If the user is not authenticated, the system may display or return an error, and processing may end. If the user is authenticated, the signature process may proceed. For example, at operation 1230 the system may determine the processed signature data of the user that is associated with the user. For example, by consulting a database (e.g., data store 118). In the case in which FIG. 12 is performed by a network-based signature service, the processed signature data may be transmitted to the user's computing device. In examples in which the user has multiple signatures, the system may determine which signature to use. For example, all the signatures of the user may be presented to the user as selectable (e.g., by gaze) buttons.

Figure 13:
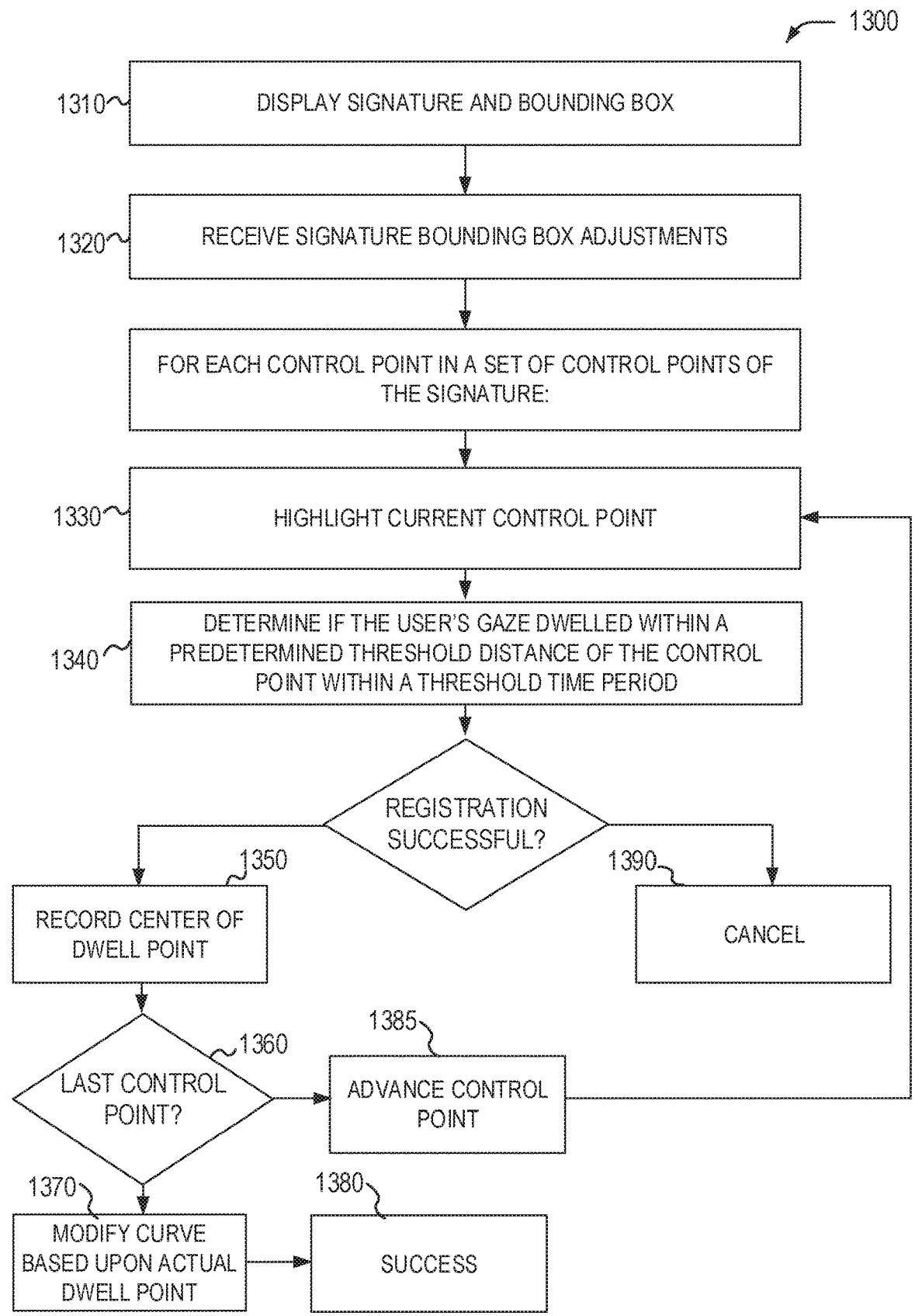
FIG. 13 shows a flowchart of a method of one example signature process according to some examples of the present disclosure.

Once the user is authenticated and the signature determined, the signature process may begin. FIG. 13 shows a flowchart of a method 1300 of one example signature process according to some examples of the present disclosure. At operation 1310 the chosen signature may be displayed on a display screen of a user's computing device with a bounding box, such as shown in FIG. 3. The system may receive one or more signature bounding box adjustments at operation 1320 as previously described. These adjustments may be saved for later rotating, translating, skewing, and scaling the signature for application to the signature after the user registers the control points (e.g., operations 1350-1390). In other examples, the adjustments may be performed prior to the process of registering the control points—that is, the user performs the operations of registering the control points on the modified signature.

Operations 1330-1360 may be performed for each control point in a set of control points corresponding to the set of one or more components of the signature. In some examples, the set of control points may comprise all control points of one, more, or all components of the signature. Thus, a user may need to register some control points of some components, all control points of some components, some control points of all components, or all control points of all components. At operation 1330 the current control point may be highlighted.

At operation 1340, the system may determine if the user's gaze dwelled within a predetermined threshold distance of the current control point within a threshold time period (or as previously noted, the first control point may be untimed). If the registration was not successful, then at operation 1390 the signing process is cancelled. If the registration was successful, the actual dwell point may be recorded for later modification of the signature as discussed above.

At operation 1360 a determination is made as to whether the user has registered the last control point. If not, then at operation 1385, the system advances to the next control point (e.g., advancing the current control point to a next control point in the set). Control then proceeds to operation 1330, if the user has registered all control points, then at operation 1370 the system may utilize the actual dwell points for the control points registered at operation 1350 to modify the curves. In some examples, all control points may be modified, in other examples, only certain control points may be modified (e.g., the middle control points of a Bezier curve so as to maintain the curves continuity with the next curve). The signature may be modified according to the adjustments to the bounding box made at operation 1320. At operation 1380 the signature may be considered successful. For example, instructions may be generated for a robotic hand to draw the signature, or an indication on a digital document may be created and affixed to the electronic document to indicate assent.

Figure 14:
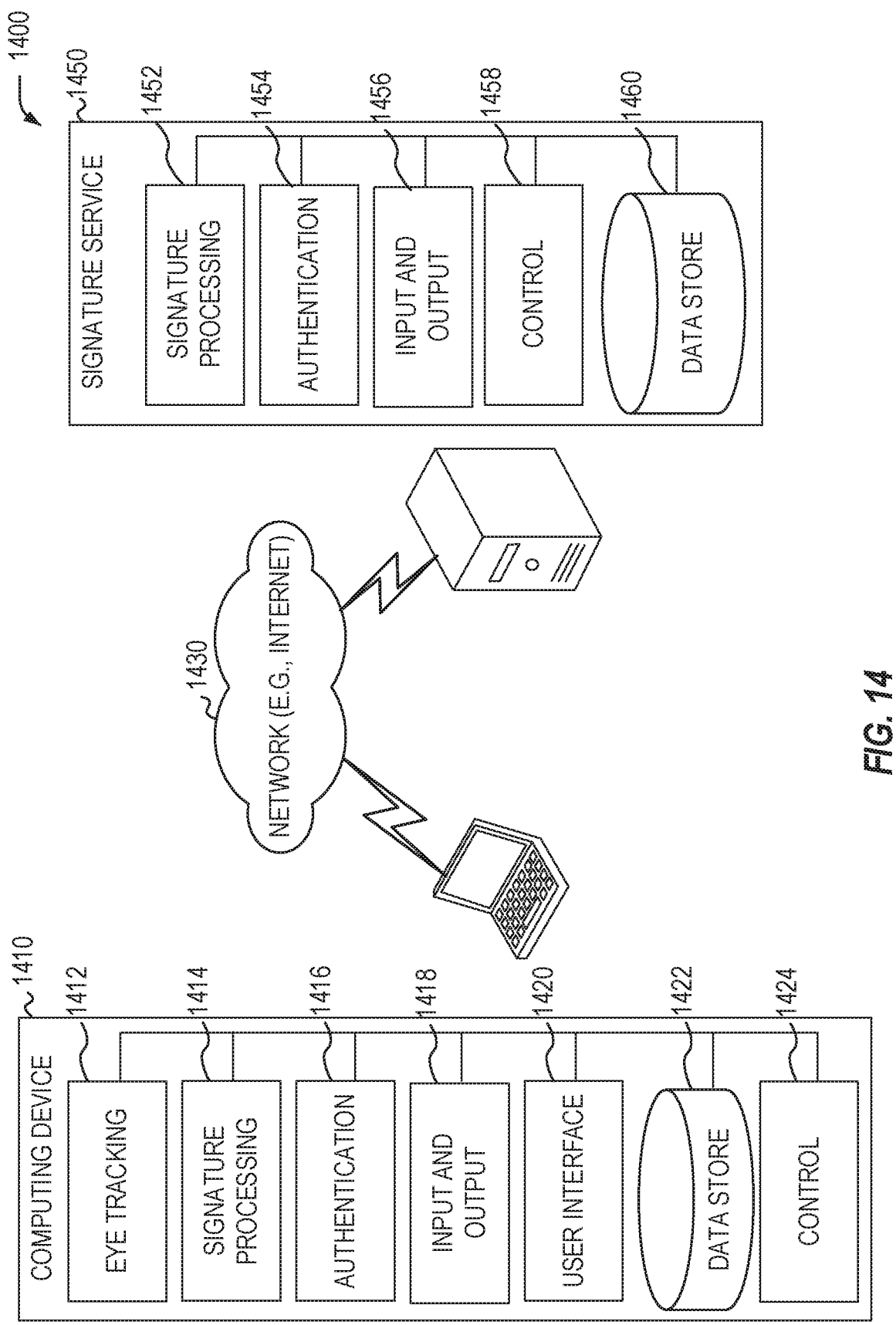
FIG. 14 shows a schematic of a computing device and a network-based signature service according to some examples of the present disclosure.

FIG. 14 shows a schematic of a computing device 1410 and a network-based signature service 1450 according to some examples of the present disclosure. As previously noted, in some examples, the functionality as described herein may be implemented solely on the user's computing device (e.g., computing device 1410), but in other examples, some functionality may be handled by a network-based signature service 1450. The components of FIG. 14 may be configured to communicate with each other, for example, via a network coupling (such as network 1430), shared memory, a bus, a switch, and the like. It will be appreciated that each component may be implemented as a single component, combined into other components, or further subdivided into multiple components. Any one or more of the components described herein may be implemented using hardware (e.g., a processor of a machine) or a combination of hardware and software (for example machine 1500 of FIG. 15).

Eye tracking 1412 may control and process input from a gaze tracking device used to select options, register control points, and other inputs from the user described herein. In other examples, other modules may be included in place of or in addition to eye tracking 1412 to process other types of inputs. For example, a sip-and-puff component may control and process input from a sip-and-puff system. Eye tracking 1412 may output a location of a user's gaze relative to a display screen.

Input and output 1418 may control and receive signature data from one or more devices (e.g., a scanner, a camera, or the like). In some examples, the input and output 1418 may also communicate with a signature service (such as signature service 1450), such as to send signature data, facial recognition data, and to receive processed signature data.

Signature processing 1414 may receive a signature from input and output 1418 during registration and process it to create processed signature data. For example, signature processing 1414 (in some examples, an example of signature processing 230) may perform the methods of FIGS. 10 and 11. In other examples, the signature processing of signature service 1450 may process the signature. In these examples, computing device 1410 sends the digital signature for processing.

Authentication 1416 may authenticate the user by use of one or more biometric indicators e.g., facial recognition data). Authentication 1416 may be an example of authentication 222. Authentication 1416 may control and receive input from one or more image capture devices to capture images of a user's face. These images may be processed to obtain representation vectors or other facial recognition data at registration and these values may be stored along with a processed signature in data store 1422 (or in data storage 1460 of the network-based signature service). Authentication 1416 may also authenticate a user against already stored facial recognition data to ensure the user is legitimate. In other examples, the authentication 1416 may send raw image data to the signature service 1450 for processing and/or authentication there.

User interface 1420 may provide one or more user interfaces for setting up, choosing signatures, modifying signatures, and signing. For example, user interfaces shown in FIGS. 3-7. Data store 1422 may be an example of a data store 118 and 218 of FIGS. 1 and 2 and may store user profile information such as the facial recognition data and processed signature data.

Control 1424 may interact with other modules to provide for registration of a user, authenticating a user, and the signing process. For example, the control 1424 may implement FIGS. 9-13 with the assistance of other modules. For example, the eye tracking 1412 may pass received gaze location input to the control 1424. Signature processing 1414 may process received signatures for use in the signing process. Likewise, the control 1424 may calculate the difference between the gaze point and a control point to determine if the user has registered a control point. The control 1424 may also adjust one or more of the component curves of the signature based upon the actual location of the user's gaze.

Signature service 1450 may include a signature processing 1452 which may receive a digital signature from a user's computing device (e.g., computing device 1410) and may process it to obtain processed signature data. Signature processing 1452 (in some examples, an example of signature processing 230) may perform the same functions as signature processing 1414.

Signature service 1450 may include authentication 1454 (which may be an example of authentication 222) which may authenticate the user based upon a biometric indicator. For example, authentication 1454 may receive image data from an image capture device communicatively coupled to (or part of) computing device 1410 and may process this image data to create facial recognition data (e.g., a representation vector) during registration. Authentication 1454 may also receive image data from a user prior to signing and authenticate the user based upon stored facial recognition data and the received image data.

Signature service 1450 may include an input and output 1456. Input and output 1456 may communicate with one or more computing devices, such as computing device 1410. This may include receiving signature data, sending processed signature data, receiving facial recognition information, and the like.

Signature service 1450 may include a control 1458 which may handle registering users. For example, control 1458 may receive facial recognition data from the facial recognition 1454 and associate it with a user's profile in the data store 1460 (data store 1460 may be an example of data store 118 and 218). Control 1458 may also receive a processed signature from either the signature processing 1414 of the computing device 1410 (via input and output 1456) or signature processing 1452 of the signature service 1450 and associate it with the user's profile in the data store 1460. Control 1458 may work with facial recognition 1454 to authenticate a user by providing the facial recognition data (e.g., representation vector) associated with the user to the facial recognition 1454 when the user is attempting to sign something and by instructing the input and output 1456 to send the processed signature to the computing device 1410 if the facial recognition 1454 returns an indication that the user is authenticated. In some examples in which there are multiple signatures, the signature service 1450 may send all the processed signatures to the computing device 1410 to allow the user to choose which signature to utilize.

Figure 15:
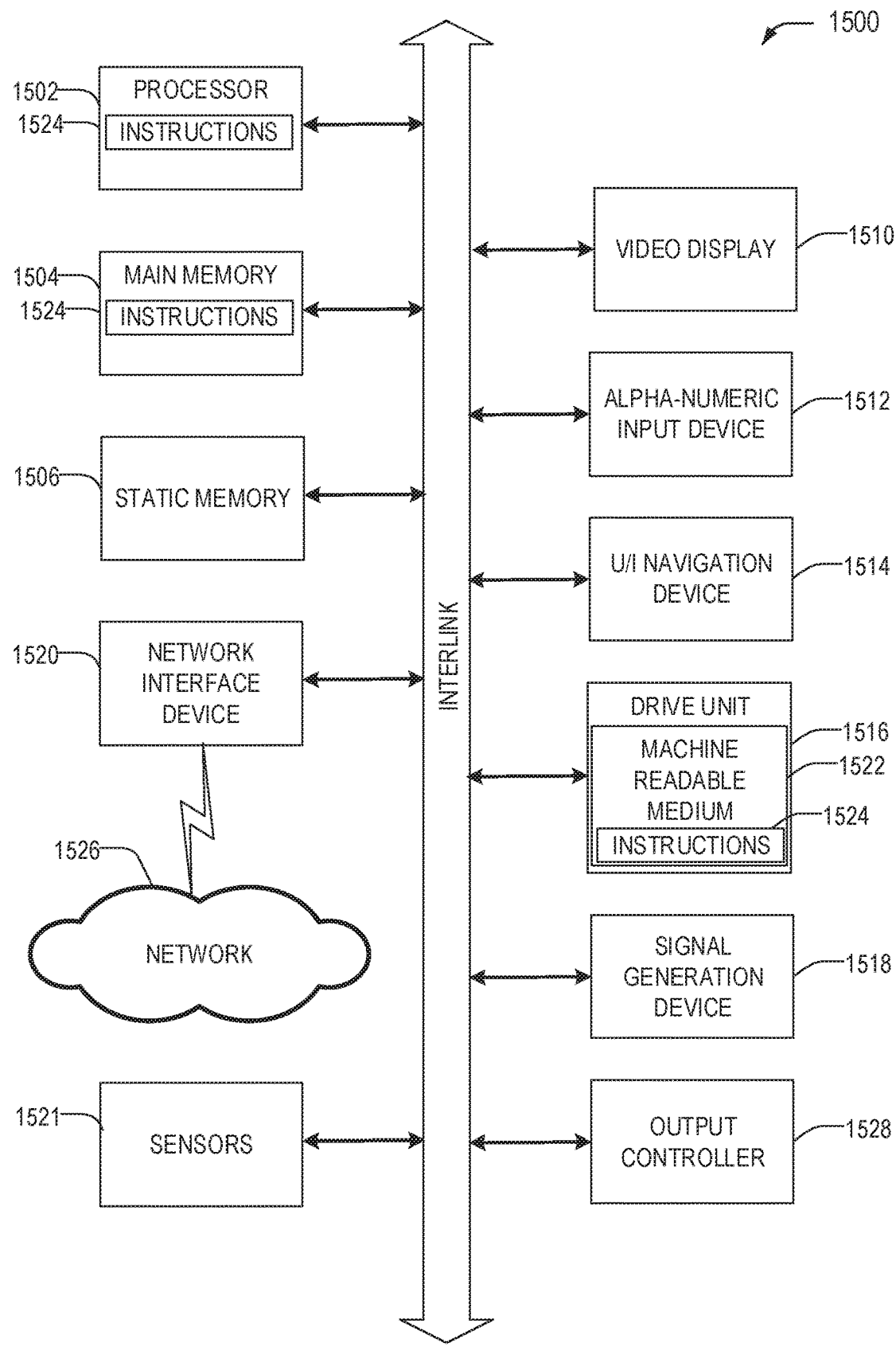
FIG. 15 is a block diagram illustrating an example of a machine upon which one or more embodiments may be implemented.

FIG. 15 illustrates a block diagram of an example machine 1500 upon which any one or more of the techniques (e.g., methodologies) discussed herein may perform. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a computing device such as a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 1500 may implement the operations shown in FIGS. 1 and 2, provide the GUIs of FIGS. 3-7, transform the curve as in FIG. 8, perform methods of FIGS. 9-13 and implement the computing device 1410 or the signature service 1450 of FIG. 14. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Components, modules, or mechanisms are tangible entities (e.g., hardware) capable of performing specified operations and may be configured or arranged in a certain manner. In an example, circuits may be arranged (e.g., internally or with respect to external entities such as other circuits) in a specified manner as components, modules, or mechanisms. In an example, the whole or part of one or more computer systems (e.g., a standalone, client or server computer system) or one or more hardware processors may be configured by firmware or software (e.g., instructions, an application portion, or an application) as components, modules, or mechanisms that operate to perform specified operations. In an example, the software may reside on a machine readable medium. In an example, the software, when executed by the underlying hardware of the module, causes the hardware to perform the specified operations.

Accordingly, the terms component, module, or mechanism is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components, modules, or mechanisms are temporarily configured, each of the components, modules, or mechanisms need not be instantiated at any one moment in time. For example, where the components, modules, or mechanisms comprise a general-purpose hardware processor configured using software, the general-purpose hardware processor may be configured as respective different components, modules, or mechanisms at different times. Software may accordingly configure a hardware processor, for example, to constitute particular components, modules, or mechanisms at one instance of time and to constitute different components, modules, or mechanisms at a different instance of time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine readable medium 1522 is illustrated as a single medium, the term "machine readable medium" may include a single medium or multiple media (e.g., a centralized or distributed database, and/or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1524 may further be transmitted or received over a communications network 1526 using a transmission medium via the network interface device 1520. The Machine 1500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. In some examples, the network interface device 1520 may wirelessly communicate using Multiple User MIMO techniques.

OTHER NOTES AND EXAMPLES

Example 1 is a machine-readable medium that includes instructions which when executed by a machine, cause the machine to perform operations for signing an object, the operations comprising: displaying a visual representation of a component of a signature of a user on a display screen, the visual representation of the component of the signature of the user defined by a plurality of control points; displaying an indicator proximate to a particular control point of the plurality of control points on the display screen; detecting that the user has registered the particular control point by receiving an input, from an input device, at a set of coordinates, the set of coordinates being within a predetermined threshold distance of the particular control point; and responsive to detecting that the user has registered the particular control point: modifying the particular control point based upon the set of coordinates; modifying the displayed visual representation of the component of the signature based upon the modified particular control point; and outputting an indication that the user has agreed to sign the object.

In Example 2, the subject matter of Example 1 optionally includes wherein the object is a digital document and wherein the operations of outputting the indication that the user has agreed to sign the object comprises affixing a digital representation of the modified visual representation of the component of the signature to the digital document.

In Example 3, the subject matter of any one or more of Examples 1-2 optionally include wherein the object is a physical object and wherein the operations of outputting the indication that the user has agreed to sign the object comprises outputting instructions executable by a machine to sign the modified visual representation of the component of the signature on the physical object.

In Example 4, the subject matter of any one or more of Examples 1-3 optionally include wherein the input is received from one of: a gaze tracking device, a sip-and-puff device, a mouse, a stylus, and a pen.

In Example 5, the subject matter of any one or more of Examples 1-4 optionally include wherein registering the particular control point comprises receiving the input at the set of coordinates within the predetermined threshold distance of the particular control point for a predetermined time period.

In Example 6, the subject matter of any one or more of Examples 1-5 optionally include wherein at least three of the plurality of control points are control points describing a Bezier curve, the Bezier curve approximating a portion of the signature of the user.

In Example 7, the subject matter of any one or more of Examples 1-6 optionally include wherein the operations comprise: determining a set of two or more control points from the plurality of control points, the set of control points including the particular control point; responsive to detecting the user has registered the particular control point, for each remaining control point in the set of control points: advancing the displayed indicator to the next control point in the set of control points; and detecting that the user has registered the next control point; and wherein outputting the indication that the user has agreed to sign the object occurs only after the user has registered all the control points in the set of two or more control points.

In Example 8, the subject matter of any one or more of Examples 1-7 optionally include wherein the operations comprise: receiving facial recognition data from the user from an image capture device; authenticating the user based upon a match between the facial recognition data from the user and stored facial recognition data from the user.

In Example 9, the subject matter of any one or more of Examples 1-8 optionally include wherein the operations comprise: receiving a digital representation of the signature; and determining the visual representation of the component of the signature and the plurality of control points by converting the digital representation of the signature to one or more Bezier curves based upon a threshold of summed slope tangents of consecutive points of the digital representation.

Example 10 is a method for signing an object, the method comprising: displaying a visual representation of a component of a signature of a user on a display screen, the visual representation of the component of the signature of the user defined by a plurality of control points; displaying an indicator proximate to a particular control point of the plurality of control points on the display screen; detecting that the user has registered the particular control point by receiving an input, from an input device, at a set of coordinates, the set of coordinates being within a predetermined threshold distance of the particular control point; and responsive to detecting that the user has registered the particular control point: modifying the particular control point based upon the set of coordinates; modifying the displayed visual representation of the component of the signature based upon the modified particular control point; and outputting an indication that the user has agreed to sign the object.

In Example 11, the subject matter of Example 10 optionally includes wherein the object is a digital document and wherein outputting the indication that the user has agreed to sign the object comprises affixing a digital representation of the modified visual representation of the component of the signature to the digital document.

In Example 12, the subject matter of any one or more of Examples 10-11 optionally include wherein the object is a physical object and wherein outputting the indication that the user has agreed to sign the object comprises outputting instructions executable by a machine to sign the modified visual representation of the component of the signature on the physical object.

In Example 13, the subject matter of any one or more of Examples 10-12 optionally include wherein the input is received from one of: a gaze tracking device, a sip-and-puff device, a mouse, a stylus, and a pen.

In Example 14, the subject matter of any one or more of Examples 10-13 optionally include wherein registering the particular control point comprises receiving the input at the set of coordinates within the predetermined threshold distance of the particular control point for a predetermined time period.

In Example 15, the subject matter of any one or more of Examples 10-14 optionally include wherein at least three of the plurality of control points are control points describing a Bezier curve, the Bezier curve approximating a portion of the signature of the user.

In Example 16, the subject matter of any one or more of Examples 10-15 optionally include wherein the operations comprise: determining a set of two or more control points from the plurality of control points, the set of control points including the particular control point; responsive to detecting the user has registered the particular control point, for each remaining control point in the set of control points: advancing the displayed indicator to the next control point in the set of control points; and detecting that the user has registered the next control point; and wherein outputting the indication that the user has agreed to sign the object occurs only after the user has registered all the control points in the set of two or more control points.

In Example 17, the subject matter of any one or more of Examples 10-16 optionally include wherein the operations comprise: receiving facial recognition data from the user from an image capture device; authenticating the user based upon a match between the facial recognition data from the user and stored facial recognition data from the user.

In Example 18, the subject matter of any one or more of Examples 10-17 optionally include wherein the operations comprise: receiving a digital representation of the signature; and determining the visual representation of the component of the signature and the plurality of control points by converting the digital representation of the signature to one or more Bezier curves based upon a threshold of summed slope tangents of consecutive points of the digital representation.

Example 19 is a system for signing an object, the system comprising: a processor; a memory communicatively coupled to the processor and including instructions, which when executed by the processor cause the system to perform the operations comprising: displaying a visual representation of a component of a signature of a user on a display screen, the visual representation of the component of the signature of the user defined by a plurality of control points; displaying an indicator proximate to a particular control point of the plurality of control points on the display screen; detecting that the user has registered the particular control point by receiving an input, from an input device, at a set of coordinates, the set of coordinates being within a predetermined threshold distance of the particular control point; and responsive to detecting that the user has registered the particular control point: modifying the particular control point based upon the set of coordinates; modifying the displayed visual representation of the component of the signature based upon the modified particular control point; and outputting an indication that the user has agreed to sign the object.

In Example 20, the subject matter of Example 19 optionally includes wherein the object is a digital document and wherein outputting the indication that the user has agreed to sign the object comprises affixing a digital representation of the modified visual representation of the component of the signature to the digital document.

In Example 21, the subject matter of any one or more of Examples 19-20 optionally include wherein the object is a physical object and wherein outputting the indication that the user has agreed to sign the object comprises outputting instructions executable by a machine to sign the modified visual representation of the component of the signature on the physical object.

In Example 22, the subject matter of any one or more of Examples 19-21 optionally include wherein the input is received from one of: a gaze tracking device, a sip-and-puff device, a mouse, a stylus, and a pen.

In Example 23, the subject matter of any one or more of Examples 19-22 optionally include wherein registering the particular control point comprises receiving the input at the set of coordinates within the predetermined threshold distance of the particular control point for a predetermined time period.

In Example 24, the subject matter of any one or more of Examples 19-23 optionally include wherein at least three of the plurality of control points are control points describing a Bezier curve, the Bezier curve approximating a portion of the signature of the user.

In Example 25, the subject matter of any one or more of Examples 19-24 optionally include wherein the operations comprise: determining a set of two or more control points from the plurality of control points, the set of control points including the particular control point; responsive to detecting the user has registered the particular control point, for each remaining control point in the set of control points: advancing the displayed indicator to the next control point in the set of control points; and detecting that the user has registered the next control point; and wherein outputting the indication that the user has agreed to sign the object occurs only after the user has registered all the control points in the set of two or more control points.

In Example 26, the subject matter of any one or more of Examples 19-25 optionally include wherein the operations comprise: receiving facial recognition data from the user from an image capture device; authenticating the user based upon a match between the facial recognition data from the user and stored facial recognition data from the user.

In Example 27, the subject matter of any one or more of Examples 19-26 optionally include wherein the operations comprise: receiving a digital representation of the signature; and determining the visual representation of the component of the signature and the plurality of control points by converting the digital representation of the signature to one or more Bezier curves based upon a threshold of summed slope tangents of consecutive points of the digital representation.

What is claimed is:

1. A non-transitory machine-readable storage device that includes instructions which when executed by a machine, cause the machine to perform operations for signing an object, the operations comprising:
    displaying a visual representation of a component of a signature of a user on a display screen, the visual representation of the component of the signature of the user is defined by a plurality of control points;
    displaying, according to a defined sequence, an indicator proximate to, or at, each control point of the plurality of control points on the display screen;
    detecting that the user has registered each of the plurality of control points in order according to the defined sequence, a control point registered by receiving, for each particular control point, an input, from an input device, at a set of coordinates, the set of coordinates being within a predetermined threshold distance of the particular control point;
    responsive to detecting that the user has registered the particular control point:

moving a location of the particular control point to a different location, the different location based upon the input set of coordinates corresponding to the registration of the particular control point; and modifying the displayed visual representation of the component of the signature based upon the different location of the particular control point;

responsive to detecting that the user has registered each of the plurality of control points in order according to the defined sequence, outputting an indication that the user has agreed to sign the object.

2. The non-transitory machine-readable storage device of claim 1, wherein the object is a digital document and wherein the operations of outputting the indication that the user has agreed to sign the object comprises affixing a digital representation of the modified visual representation of the component of the signature to the digital document.

3. The non-transitory machine-readable storage device of claim 1, wherein the object is a physical object and wherein the operations of outputting the indication that the user has agreed to sign the object comprises outputting instructions executable by a machine to sign the modified visual representation of the component of the signature on the physical object.

4. The non-transitory machine-readable storage device of claim 1, wherein the input is received from one of: a gaze tracking device, a sip-and-puff device, a mouse, a stylus, and a pen.

5. The non-transitory machine-readable storage device of claim 1, wherein registering the particular control point comprises receiving the input at the set of coordinates within the predetermined threshold distance of the particular control point for a predetermined time period.

6. The non-transitory machine-readable storage device of claim 1, wherein at least three of the plurality of control points are control points describing a Bezier curve, the Bezier curve approximating a portion of the signature of the user.

7. The non-transitory machine-readable storage device of claim 1,
wherein a visual representation of the indicator is distinct from the displayed visual representation of the component of the signature.

8. The non-transitory machine-readable storage device of claim 1, wherein the operations comprise:
receiving facial recognition data from the user from an image capture device;
authenticating the user based upon a match between the facial recognition data from the user and stored facial recognition data from the user.

9. The non-transitory machine-readable storage device of claim 1, wherein the operations comprise:
receiving a digital representation of the signature; and
determining the visual representation of the component of the signature and the plurality of control points by converting the digital representation of the signature to one or more Bezier curves based upon a threshold of summed slope tangents of consecutive points of the digital representation.

10. A method for signing an object, the method comprising:
displaying a visual representation of a component of a signature of a user on a display screen, the visual representation of the component of the signature of the user is defined by a plurality of control points;
displaying, according to a defined sequence, an indicator proximate to, or at, each control point of the plurality of control points on the display screen;
detecting that the user has registered each of the plurality of control points in order according to the defined sequence, a control point registered by receiving, for each particular control point, an input, from an input device, at a set of coordinates, the set of coordinates being within a predetermined threshold distance of the particular control point;
responsive to detecting that the user has registered the particular control point:
moving a location of the particular control point to a different location, the different location based upon the input set of coordinates corresponding to the registration of the particular control point; and
modifying the displayed visual representation of the component of the signature based upon the different location of the particular control point;
responsive to detecting that the user has registered each of the plurality of control points in order according to the defined sequence, outputting an indication that the user has agreed to sign the object.

11. The method of claim 10, wherein the object is a digital document and wherein outputting the indication that the user has agreed to sign the object comprises affixing a digital representation of the modified visual representation of the component of the signature to the digital document.

12. The method of claim 10, wherein the object is a physical object and wherein outputting the indication that the user has agreed to sign the object comprises outputting instructions executable by a machine to sign the modified visual representation of the component of the signature on the physical object.

13. The method of claim 10, wherein registering the particular control point comprises receiving the input at the set of coordinates within the predetermined threshold distance of the particular control point for a predetermined time period.

14. The method of claim 10, wherein
a visual representation of the indicator is distinct from the displayed visual representation of the component of the signature.

15. A system for signing an object, the system comprising:
a processor;
a memory communicatively coupled to the processor and including instructions, which when executed by the processor cause the system to perform operations comprising:
displaying a visual representation of a component of a signature of a user on a display screen, the visual representation of the component of the signature of the user is defined by a plurality of control points;
displaying, according to a defined sequence, an indicator proximate to, or at, each control point of the plurality of control points on the display screen;
detecting that the user has registered each of the plurality of control points in order according to the defined sequence, a control point registered by receiving, for each particular control point, an input, from an input device, at a set of coordinates, the set of coordinates being within a predetermined threshold distance of the particular control point;
responsive to detecting that the user has registered the particular control point:
moving a location of the particular control point to a different location, the different location based upon the input set of coordinates corresponding to the registration of the particular control point; and modifying the displayed visual representation of the component of the signature based upon the different location of the particular control point;

responsive to detecting that the user has registered each of the plurality of control points in order according to the defined sequence, outputting an indication that the user has agreed to sign the object.

16. The system of claim 15, wherein the object is a digital document and wherein outputting the indication that the user has agreed to sign the object comprises affixing a digital representation of the modified visual representation of the component of the signature to the digital document.

17. The system of claim 15, wherein the object is a physical object and wherein outputting the indication that the user has agreed to sign the object comprises outputting instructions executable by a machine to sign the modified visual representation of the component of the signature on the physical object.

18. The system of claim 15, wherein the input is received from one of: a gaze tracking device, a sip-and-puff device, a mouse, a stylus, and a pen.

19. The system of claim 15, wherein registering the particular control point comprises receiving the input at the set of coordinates within the predetermined threshold distance of the particular control point for a predetermined time period.

20. The system of claim 15, wherein the operations comprise:

receiving facial recognition data from the user from an image capture device;

authenticating the user based upon a match between the facial recognition data from the user and stored facial recognition data from the user.

* * * * *